No. 675,856. Patented June 4, 1901.
T. J. JONES.
HOOP FASTENER.
(Application filed Oct. 19, 1898.)
(No Model.)
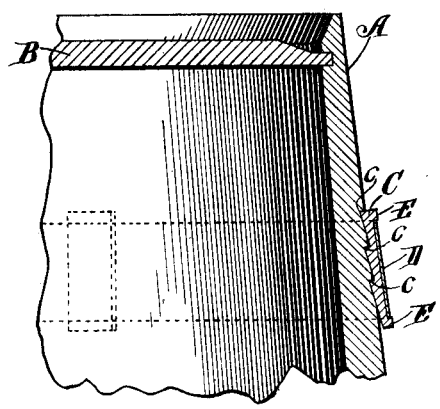
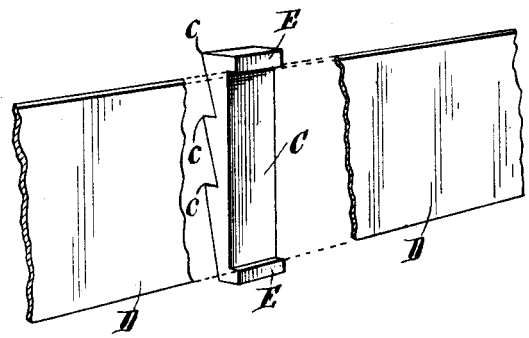
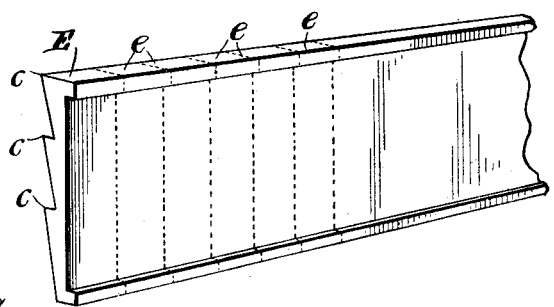
Witnesses
Inventor,
Thomas J. Jones
By Poole + Brown
Attorneys.

UNITED STATES PATENT OFFICE.

THOMAS J. JONES, OF CHICAGO, ILLINOIS, ASSIGNOR OF ONE-HALF TO WILLIAM H. O'BRIEN, OF SAME PLACE.

HOOP-FASTENER.

SPECIFICATION forming part of Letters Patent No. 675,856, dated June 4, 1901.

Application filed October 19, 1898. Serial No. 694,052. (No model.)

*To all whom it may concern:*

Be it known that I, THOMAS J. JONES, of Chicago, in the county of Cook and State of Illinois, have invented certain new and useful Improvements in Hoop-Fasteners; and I do hereby declare that the following is a full, clear, and exact description thereof, reference being had to the accompanying drawings, and to the letters of reference marked thereon, which form a part of this specification.

This invention relates to an improvement in hoop-fasteners for barrels, tubs, and the like, designed to prevent the hoops from coming off of the barrels or like receptacles.

In the drawings, Figure 1 is a perspective sectional view of a barrel whereon my invention is used. Fig. 2 is a perspective view of a fastener embodying my invention. Fig. 3 is a perspective view illustrating the manner of manufacturing the fasteners made in accordance with my invention.

As shown in the drawings, A represents the staves of a barrel.

B represents the barrel-head. D represents a hoop thereon, and C a fastener which is inserted or driven beneath the hoop or between the stave and the hoop.

The fastener C is a narrow strip of metal slightly exceeding in length the width of the hoop with which it is designed to be used. The side designed to come in contact with the hoop is plane or flat in its part in contact with the hoop and provided with lips or flanges E, which project outwardly at the ends of the fastener and are designed to prevent the hoop from slipping off the fastener. The side of the said fastener adapted to come in contact with the stave or wood of the barrel is provided with a plurality of sharp transverse angular ridges c, which are made with abrupt or transverse and angular surfaces and have their abrupt surfaces facing outwardly or toward the chime. The angular faces of said ridges have a long or gradual wedge-like incline, so as to present little resistance to driving between the hoop and the barrel. The said ridges extend the full width of the fastener, or, in other words, their end faces are in the same planes or flush with the side edges or faces of the fasteners. The fastener, provided with a lip at each end, is designed to be put on with the hoop and, together with the hoop, be driven down upon the cask.

In the use of the device the long sloping angle of the ridges permits easy driving by blows on the outer end or head of the fastener. As the hoop and fasteners are driven to place the said ridges c c c are forced into the surface of the stave and become firmly embedded therein, the abrupt faces of the said ridges affording such resistance to the outward movement of the hoops or fasteners as to avoid liability of the displacement or removal of the hoop otherwise than by a special operation for the purpose.

The provision of transverse ridges on the fasteners made as described has the important advantage of affording a secure engagement of the fastener with the staves of the barrel, the sharp ridges which extend from side to side of the fastener affording a secure hold of the fasteners on the wood of the stave, which could not be obtained by the use of prongs or pointed projections on the fasteners, inasmuch as such prongs may much more readily cut their way endwise of the staves than is possible with the transverse ridges, which engage or are embedded in the wood transversely of the grain thereof and are therefore positively held from movement thereon. The fasteners made with transverse ridges, as described, have the further important advantages of being very easily and cheaply constructed by first preparing by rolling a long strip identical in cross-section with the shape of the fastener and then cutting the same transversely at intervals corresponding with the width of the fastener. This method of making the fasteners is illustrated in Fig. 3, which shows a section of a rolled blank having longitudinal ridges thereon corresponding in shape with the transverse ridges of the fasteners. The dotted lines in said figure indicate the lines on which the blank is severed to form individual fasteners.

I claim as my invention—

A metallic hoop-fastener made of a length but slightly greater than the width of the hoop to be fastened thereby, said fastener having at its outer face a plane surface adapted to engage a hoop, and laterally-projecting parallel flanges at its outer and inner ends adapted for contact with the margins of the hoop, said fastener having upon its inner face a plurality of parallel transverse ridges having abrupt and inclined surfaces, the abrupt surfaces of which face toward the head of the fastener, and said ridges and flanges extending to the side edges of the fastener with their end faces flush with said side edges.

In testimony that I claim the foregoing as my invention I affix my signature, in presence of two witnesses, this 18th day of July, A. D. 1898.

THOMAS J. JONES.

Witnesses:
C. CLARENCE POOLE,
R. CUTHBERT VIVIAN.